Sept. 19, 1972 L. O. SORMANI 3,692,557
PROCESS FOR PRODUCING AN ANTIQUE FINISH
Original Filed March 18, 1969
INVENTOR
LUIGI OSCAR SORMANI
BY Cushman, Darby & Cushman
ATTORNEYS

United States Patent Office

3,692,557
Patented Sept. 19, 1972

3,692,557
PROCESS FOR PRODUCING AN ANTIQUE FINISH
Luigi Oscar Sormani, Omaha, Nebr., assignor to Raymond
   J. Walowski, Omaha, Nebr.
Continuation of abandoned application Ser. No. 808,092,
   Mar. 18, 1969. This application Nov. 23, 1970, Ser.
   No. 92,266
            Int. Cl. B44d 1/14; C09d 5/28
U.S. Cl. 117—41                                  6 Claims

ABSTRACT OF THE DISCLOSURE

Decorative "antique" finishes are produced by the three step process of this invention whereby a first composition comprising an acrylic emulsion polymer, ground marble and a liquid polyurethane composition are applied to an appropriate surface; upon drying, a second composition comprising a water soluble coloring material is applied; and finally the first composition is again applied. The first step can be eliminated if the surface to be finished is of a non-absorbent substance, for example, metal, glass, or finished furniture.

---

This is a continuation of Ser. No. 808,092, filed Mar. 18, 1969, now abandoned.

This invention relates to a novel coating composition and process of application which can be applied to a variety of surfaces to give a decorative crackle finish, which is both attractive, flexible and very durable. More particularly this invention relates to a crackle finish having an antique appearance which is produced by applying in the proper sequence, the novel compositions of this invention.

It is well known in the art to provide interesting and decorative finishes to a variety of surfaces by applying various coating compositions either alone or in combination and in certain sequences. U.S. Reissue Pat. 16,760 to Egelhoff discloses producing a crackled finish by applying a first coat of painter's varnish, rosin, benzene, linseed oil and oyster shell, followed by a second slower drying coating consisting of wood alcohol, denatured alcohol, benzene and lead carbonate. U.S. Pat. 2,350,818 to Rees discloses forming a crackle finish by first applying an undercoat which may be shellac or any other type of wood sealer, and then applying a second coat containing lacquer and starch nitrate, along with a resin or plasticizer, and finally, once the finish has dried, applying a glazing material or clear lacquer. An ornamental finish was produced by Soff, U.S. Pat. 2,351,717 by applying to a surface a single composition containing finely divided particles of fibrous material such as hair or wood and a binder such as shellac, lacquer, nitrocellulose and natural or synthetic resins. U.S. Pat. 2,714,560 to Hookway, in addition to discussing extensively the prior art on producing crackle finishes, discloses applying a slow drying varnish which may be pigmented and, while it is still tacky, recoating it with a latex emulsion paint to produce a crackle finish. A glossy crackle coating was produced by Martin, U.S. Pat. 2,866,720 by spraying a thermoplastic film forming polymer on to a synthetic resin enamel base coat, such as epoxy or silicone resin.

Now in accordance with the present invention, it has been found that an attractive and colorful finish having great strength, flexibility and resistance to friction and which has the "antique" appearance of old painted or otherwise finished articles, for instance furniture, on which the finish has "cracked," is produced by applying to the surface of the material which is being finished, in the proper sequence, the compositions of this invention. More specifically, according to the present invention, a first composition comprising about 30–40% by weight acrylic resin emulsion, 30–40% by weight fine ground marble, 10–40% by weight liquid polyurethane and 2–20% by weight water is first applied to the surface of the material. The application of this first composition can be by any convenient means such as, for example, by brush. Following application of this first composition the surface is allowed to stand until it is dry, which typically is about five minutes, there is no disadvantage to allowing the first composition to stand indefinitely after it has dried until the second composition is applied. The second composition is applied after the first composition has dried and comprises a strong transparent pigment of the desired coloration in a suitable solvent which, after drying will "bleed through" upwards after the application of the third step in the process. Application of this second composition can be by any suitable means such as by brush, sprayer or from an aerosol can. Once the pigmented second composition has dried—which may take about five minutes—the first composition comprising the acrylic resin emulsion, ground marble, polyurethane, and water as above described, is applied again by any suitable means.

It has been found that, according to the present invention, where the surface to be finished is non-absorbent, e.g. metal, glass or furniture already provided with a finish, the first application of the composition comprising acrylic resin emulsion, ground marble, polyurethane and water can be eliminated. Accordingly, the second composition of this invention comprising a water soluble pigment is applied directly to the non-absorbent surface, allowed to dry and the "first" composition then applied in the previously described manner.

As the drying proceeds during and following the above-described application procedure, an interesting and attractive pattern of cracks appears in the finish which is similar in appearance to that of old furniture on which the paint and varnish have cracked. The "antique" appearance produced by the present invention is enhanced by the fact that often the pigmentation will tend to accumulate in the cracks which form, causing the cracks often to appear somewhat darker than the rest of the surface and thereby to be accentuated.

Further, by slight changes in the formulation, i.e. by varying the proportions of the ingredients or the color of pigment, it is possible to produce a great number of different finishes, for example imitating wood, marble, stone and wood bark.

The finish produced by the present invention can be applied to a variety of different surfaces, for example wood, cardboard, paper or metal, resulting in a finished product which, because of its toughness, flexibility and washability, finds a variety of applications, for example antiquing kits, furniture, floors, dry walls, and picture frames.

The acrylic resin emulsion employed in the present invention can be, for example, an aqueous polymer emulsion containing about 40–50 weight percent and preferably 46–47 weight percent solid resin which is a water insoluble vinyl copolymer of 2 to 20 (preferably 2 to 10) parts of acrylamide or methacrylamide or methylol or methoxymethyl acrylamide or methacrylamide with 80 to 98 parts of at least one monomer of the group of lower alkyl esters of acrylic acid and methacrylic acid, styrene, p-methyl styrene, o-methyl styrene, m-methyl styrene and acrylonitrile. Examples of alkyl acrylates and methacrylates are methyl acrylates, ethyl acrylate, propyl acrylate, isopropyl acrylate, butyl acrylate, hexyl acrylate, heptyl acrylate, n-octyl acrylate, 2-ethylhexyl acrylate, iso-octyl acrylate and the corresponding esters of methacrylic acid, e.g. methyl methacrylate, ethyl methacrylate, butyl methacrylate and n-octyl methacrylate.

The preferred vinyl compound polymer is a copolymer of acrylamide (or methacrylamide), an acrylate ester and a methacrylate ester, most preferably a copolymer of 2 to 10% acrylamide and 98 to 90% of a mixture of 1 to 3 parts of ethyl acrylate with 1 part of methyl methacrylate, e.g. of copolymer of ethyl acrylate and methyl methacrylate in a ratio of 1:1 or 2:1.

Specific examples of vinyl copolymers which are suitable are:

(1) A terpolymer made from 180 parts of ethyl acrylate, 222 parts of methyl methacrylate and 21.2 parts of methacrylamide;

(2) A terpolymer of 210 parts 2-ethylhexyl acrylate, 573 parts methyl methacrylate and 40 parts methacrylamide;

(3) A polymer of 330 parts of ethyl acrylate, 330 parts of vinyl toluene, 15 parts of methoxymethyl methacrylamide and 15 parts of acrylamide;

(4) A terpolymer of 440 parts of ethyl acrylate, 340 parts methyl methacrylate, and 37 parts of acrylamide;

(5) A polymer made of 440 parts ethyl acrylate, 340 parts methyl acrylate and 37 parts acrylamide further reacted with 100 parts of styrene;

(6) A polymer of 89 parts of ethyl acrylate, 110 parts methyl methacrylate, 5.25 parts methacrylamide and 5.75 parts of methylol methacrylamide;

(7) A terpolymer of 52.5 parts methyl methacrylate, 42.5 parts ethyl acrylate and 5 parts methacrylamide;

(8) A terpolymer of 66 parts ethyl acrylate, 26 parts methyl methacrylate and 8 parts methacrylamide;

(9) A terpolymer of 42.5 parts ethyl acrylate, 52.5 parts of styrene and 5 parts methacrylamide;

(10) A terpolymer of 42.5 parts of ethyl acrylate, 26.5 parts styrene, 26.5 parts methyl methacrylate and 4.5 parts methacrylamide;

(11) A terpolymer of 67 parts ethyl acrylate, 33 parts methyl methacrylate and 5 parts acrylamide.

The preferred resin is a mixture of 30% pentahydroxymethyl melamine and 70% of a terpolymer of 67 parts ethyl acrylate, 33 parts methyl methacrylate and 5 parts acrylamide.

The polyurethane composition employed in this invention is of the type conventionally used to form protective coats and conveniently can be, for example, the polyurethane oil formed by reacting toluene diisocyanate with a partial ester formed by partially esterifying polyols, such as for example, pentaerythritol, glycerine and $\alpha$-methyl glucoside, with various fatty acids, e.g. linolenic, linoleic, oleic, palmitic and stearic, either alone or in combination, e.g. tall oil. It is desirable that the partial ester of the fatty acid contains less than one free hydroxyl group to one ester molecule, for example, one free hydroxyl group per three ester molecules. It is also desirable that the urethane have a ratio of NCO/OH of less than 1.00 or even 0.5, though higher ratios of NCO/OH can be used.

Suitable urethanes for use in the present invention can also be prepared which are of the type known as "prepolymers" which are cured on exposure to the moisture in the air on the evaporation of the solvent in which they are dissolved. The urethane prepolymers are prepared by reacting excess polyisocyanate, with polyfunctional hydroxyl-containing such as polyethers, castor oil and polyesters or other polyols. Suitable polyols can be, for example, polypropylene glycol, neopentyl glycol, trimethylpropane etc. Generally the ratio of NCO/OH can be about 4–5.0:1 in these prepolymers.

Advantageously about 40–50 weight percent of either the polyurethane oils or prepolymers described above can be dissolved in a suitable aliphatic hydrocarbon solvent, e.g. kerosine etc. or other solvents commonly used in the preparation of urethane coatings, e.g. toluene, xylene, methyl ethyl ketone and ethyl acetate along with from about 0.05 to 1.0 weight percent of the commonly used driers such as, for example, cobalt naphthenate, stannous octoate, etc.

The pigmenting compositions employed in the present invention can be, for example, an alcohol base, water soluble dyes comprising for example 5–10 weight percent aniline dyestuffs, 10–20 weight percent polyvinyl resin, 40–85 weight percent primary alcohol, e.g. ethyl or butyl alcohol.

EXAMPLE

A formulation containing two parts of an acylic resin emulsion, two parts fine ground marble, two parts liquid polyurethane and one fifth part water were applied by brush to a finished piece of carboard and allowed to dry for five minutes. At the end of five minutes a transparent alcohol base water soluble dye was applied from an aerosol can and then allowed to dry also for 5 minutes. At the end of the second 5 minute drying period, the composition which had first been applied to the cardboard was again applied and allowed to dry. As the drying proceeded, after about 10 minutes, cracks appeared in the finish into which some of the dye diffused and collected. As the cracking process continued, an attractive and distinctive pattern containing variable shades of the coloring agent used developed to produce the effect of an old cracked "antique" surface. After about 1½ hours the drying of the finish was complete and it was found that the surface which was produced, in addition to being attractive, was also flexible and strong. FIG. 1 is a photograph of the resulting surface.

The acrylic emulsion employed was an aqueous emulsion containing about 46 weight percent of a solid vinyl copolymer formed from acrylamide, ethyl acrylate and methyl methacrylate. The liquid polyurethane comprised about 54.5 weight percent aliphatic hydrocarbon, 0.5 weight percent cobalt naphthenate and about 45 weight percent of the polyurethane formed by reacting toluene diisocyanate with partial ester of a polyhydric alcohol and a mixture of linolenic, linoleic, oleic, palmitic and stearic acids. The water soluble alcohol base dye employed comprised 1½ weight percent of a synthetic aniline dye, 3½ weight percent polyvinyl resin, 20 weight percent of the mixture of ethyl and butyl alcohols and 75 weight percent dichlorodifluoro methane aerosol propellant.

I claim:

1. A process for producing an antique finish comprising steps of:
   (a) applying to a surface a first composition consisting essentially of, in weight percent of the total composition:
      (i) a water-insoluble vinyl copolymer emulsion in an amount from about 30 to about 50 weight percent, said vinyl copolymer having one monomer thereof selected from the class consisting of acrylamide, methacrylamide, methylol, and the other monomer comprising a lower alkyl ester of a compound selected from the class consisting of acrylic acid, methacrylic acid, styrene, p-methyl styrene, o-methyl styrene, m-methyl styrene and acrylonitrile,
      (ii) ground marble in an amount from about 30 to about 40 weight percent,
      (iii) liquid toluene diisocyanate-based urethane polymer in an amount from about 10 to about 40 weight percent, said urethane polymer comprising the reaction product of toluene diisocyanate and a partial ester formed by partially esterifying a polyol selected from the class consisting of pentaerythritol, glycerine, and $\alpha$-methyl glucoside with a fatty acid selected from the class consisting of tall oil, linolenic, linoleic, oleic, palmitic, stearic and mixtures thereof, and having an NCO/OH ratio of less than 1.0,
      (iv) water in an amount from about 2 to about 20 weight percent;

(b) allowing said first composition to dry;
(c) applying a second composition consisting essentially of a water soluble pigment on top of said first composition;
(d) allowing the second composition to dry;
(e) again applying the first composition on top of the second composition, and
(f) allowing the first composition applied in step (e) to dry, thereby producing an antique finish.

2. The process as claimed in claim 1 wherein said vinyl copolymer is a copolymer of acrylamide, ethyl acetate and methyl methacrylate.

3. The process as claimed in claim 1 wherein said toluene diisocyanate-based urethane polymer contains from about 40 to about 50 weight percent of an aliphatic hydrocarbon and about 0.05 to about 1.0 weight percent of a dryer.

4. A process for producing an antique finish on a non-absorbent surface which comprises:
(a) applying a first composition consisting essentially of a water soluble pigment to said surface;
(b) allowing said first composition to dry;
(c) applying a second composition consisting essentially of, in weight percent of the total composition:
  (i) a water-insoluble vinyl copolymer emulsion, in an amount from about 30 to about 50 weight percent, said vinyl copolymer having one monomer thereof selected from the class consisting of acrylamide, methacrylamide, methylol, and the other monomer comprising a lower alkyl ester of a compound selected from the class consisting of acrylic acid, methacrylic acid, styrene, p-methyl styrene, o-methyl styrene, m-methyl styrene and acrylonitrile,
  (ii) ground marble in an amount from about 30 to about 40 weight percent,
  (iii) a liquid toluene diisocyanate-based urethane polymer in an amount from about 10 to about 40 weight percent, said urethane polymer comprising the reaction product of toluene diisocyanate and a partial ester formed by partially esterifying a polyol selected from the class consisting of pentaerythritol, glycerine, and α-methyl glucoside with a fatty acid selected from the class consisting of tall oil, linolenic, linoleic, oleic, palmitic, stearic and mixtures thereof, and having a NCO/OH ratio of less than 1.0,
  (iv) water in an amount from about 2 to about 20 weight percent, on top of said first composition, and
(d) allowing said second composition to dry, thereby producing an antique finish.

5. The process as claimed in claim 4 wherein said vinyl copolymer is a copolymer of acrylamide, ethyl acetate and methyl methacrylate.

6. The process as claimed in claim 4 wherein said toluene diisocyanate-based urethane polymer contains from about 40 to about 50 weight percent of an aliphatic hydrocarbon and about 0.05 to about 1.0 weight percent of a dryer.

References Cited
UNITED STATES PATENTS

| | | | |
|---|---|---|---|
| 3,549,407 | 12/1970 | Williamson | 117—72 X |
| 3,549,404 | 12/1970 | Liberti et al. | 117—72 X |
| 2,976,168 | 3/1961 | Thompson et al. | 117—72 X |
| 2,350,818 | 6/1944 | Rees | 117—72 X |
| 2,456,671 | 12/1948 | Beynon | 117—41 |
| 3,214,286 | 10/1965 | Ramberger | 117—72 X |
| 3,565,720 | 2/1971 | Nimocks | 117—41 X |

RALPH HUSACK, Primary Examiner

U.S. Cl. X.R.

117—45, 72, 75, 76 P, 87; 260—23

UNITED STATES PATENT OFFICE
CERTIFICATE OF CORRECTION

Patent No. 3,692,557    Dated September 19, 1972

Inventor(s) LUIGI OSCAR SORMANI

It is certified that error appears in the above-identified patent and that said Letters Patent are hereby corrected as shown below:

In the heading of column 1, lines 4 and 5, cancel "assignor to Raymond J. Walowski, Omaha, Nebr." .

Signed and sealed this 25th day of December 1973.

(SEAL)
Attest:

EDWARD M. FLETCHER, JR.
Attesting Officer

RENE D. TEGTMEYER
Acting Commissioner of Patents